United States Patent [19]

Eberle et al.

[11] 3,946,178
[45] Mar. 23, 1976

[54] DEVICE FOR INDICATING THE PRESENCE OF A LOAD ON A VEHICLE SEAT

[75] Inventors: Dieter Eberle, Tamm, Wurttemberg; Dieter Hanselmann; Hans Prohaska, both of Bietigheim, Wurttemberg, all of Germany

[73] Assignee: SWF-Spezialfabrik fur Autozubehor Gustav Rau GmbH, Germany

[22] Filed: Apr. 20, 1972

[21] Appl. No.: 245,906

[30] Foreign Application Priority Data
Apr. 22, 1972 Germany............................ 7115515

[52] U.S. Cl................................ 200/85 A; 340/278
[51] Int. Cl.² ......................................... H01H 3/14
[58] Field of Search ............... 200/85 A, 61.38 B; 340/278

[56] References Cited
UNITED STATES PATENTS 3,297,841  1/1967  Campbell................... 200/61.58 B
3,375,495  3/1968  Burns.............................. 200/85 A
3,437,993  4/1969  Recio et al....................... 200/85 A Primary Examiner—David Smith, Jr.
Attorney, Agent, or Firm—McGlew and Tuttle

[57] ABSTRACT

A device for indicating the loading of a seat, particularly an automobile passenger seat, comprises a seat having a spring suspension with a pull switch mounted on a rigid plate held to the underside of the suspension. The pull switch includes an actuating member which is biased in a first switch position by a resilient element which is secured to a laterally remote part of the spring suspension and it operates on the actuating element to move it to a second switch position when the seat is loaded and the switch is moved with the spring suspension as it is flexed on the load.

9 Claims, 2 Drawing Figures

DEVICE FOR INDICATING THE PRESENCE OF A LOAD ON A VEHICLE SEAT

BACKGROUND OF THE INVENTION

1. Field of the Invention

This invention relates in general to the construction of safety devices for vehicles and, in particular, to a new and useful device for indicating the load on the seat of an automobile vehicle.

2. Description of the Prior Art

In order to increase the safety of persons conveyed in vehicles, it has been considered advisable to provide the driver with a signal when a person has occupied a passenger seat and has not yet fastened his safety belt. In order to produce this signal, a switch device is necessary, which is actuated when the automobile vehicle seat is loaded. The known devices are unsatisfactory because of their expense, unreliability and their complicated nature.

SUMMARY OF THE INVENTION

The present invention provides a device which is adapted to be incorporated in a seat frame, which includes a rigid frame structure and a spring suspension system secured to the structure which has at least a horizontal portion which sags or flexes when the seat is loaded. The present invention provides a switch device which may be easily secured to the underside of the resilient spring suspension and which may be actuated when the spring suspension is flexed in order to indicate the loading of the seat. The device includes a pull switch which is mounted on a rigid plate which is held against the underside of the spring suspension. The spring housing is secured at one end to one end frame member of the spring frame of the seat suspension, and the opposite end includes an actuating member which is held by resilient elements which are engaged with remote portions of the spring frame, for example, the corner portions. The resilient spring suspension sags when the seat is loaded to cause actuation of the actuation member by the pulling of the resilient elements engaged therewith. The resilient elements which are engaged with the actuating member convert the deflection of the switch into an actuating movement of the member. The switch may also have a make, a break or a changeover contact depending upon the particular actuating circuit which is employed. With the invention arrangement, one end of the spring switch housing is advantageously secured to the spring suspension by a rigid support bar and the opposite end containing the actuator member, which is movable, is advantageously suspended by obliquely extending resilient members, or elastic bands, which extend to respective corners of the spring suspension from a central location of the actuating switch housing. A deflection of the pull switch is not impeded by a pivotal connection between the support bars of the spring suspension and the switch. In order to ensure high response sensitivity of the switch, with any unequal loading of the seat, it is proposed that the switch housing be secured on a contact plate which is supported in the central area of the seat and that the housing itself be secured by a rigid support bar connected to a rear spring bar member of the spring suspension system. The opposite end is supported by two rubber bands which extend outwardly from the actuating member to the respective corners of the spring suspension frame. The rigid support bar for securing one end of the switch housing is angled at an end and secured to the spring frame by a clamping sleeve. The elastic or rubber bands which are secured to the actuator element are preferably O-shaped and are secured in eyelets of the actuating member of the pull switch. The attachment of the free ends of these bands on the frame of the seat suspension is achieved by passing them through a bore in a double-bore disc plate which has another bore which is secured on the spring suspension frame. The plates are secured in a fixed position on the spring frame by means of holding or fixing discs arranged on each side. These fixing discs are formed of a plastic material and may be constructed as engaging hooks which may be engaged over the spring frame. The arrangement makes it possible to attach the device to the known seat frame constructions.

Accordingly, it is an object of the invention to provide an improved device for indicating the loading of a seat which comprises a seat having a resilient spring suspension frame forming the horizontal seat portion of the seat with a pull switch secured to the underside of the frame by a rigid connection at one end of the housing and by resilient elements which engage the actuating member of the switch in a manner such that the switch actuating member is displaced when the seat suspension frame is flexed under loading.

A further object of the invention is to provide a device for indicating the loading of a seat which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

GENERAL DESCRIPTION OF THE PREFERRED EMBODIMENT

Figure 1:
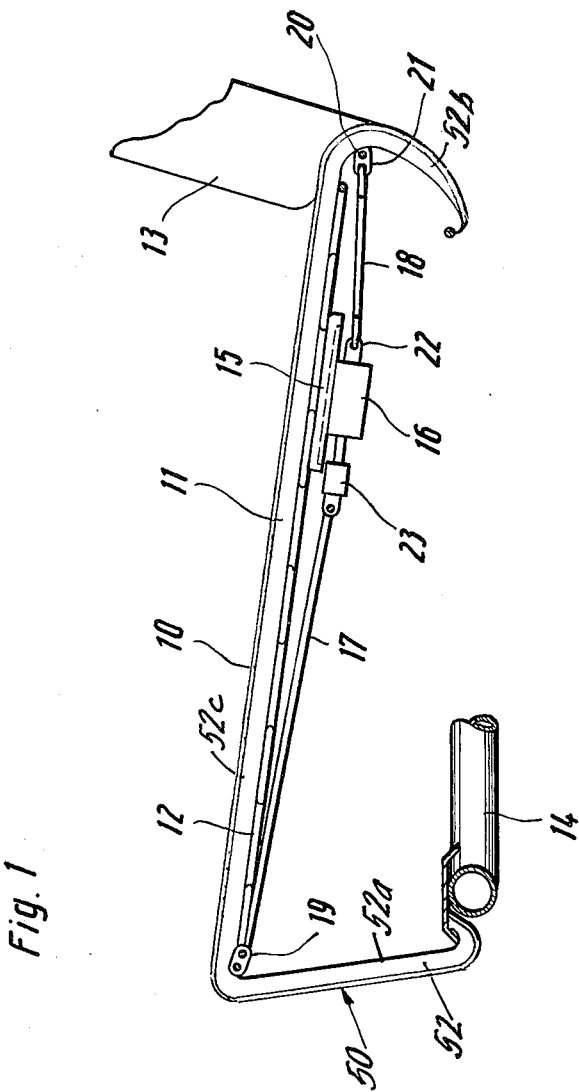
FIG. 1 is a longitudinal sectional view of a seat having a load indicating device constructed in accordance with the invention.
Figure 2:
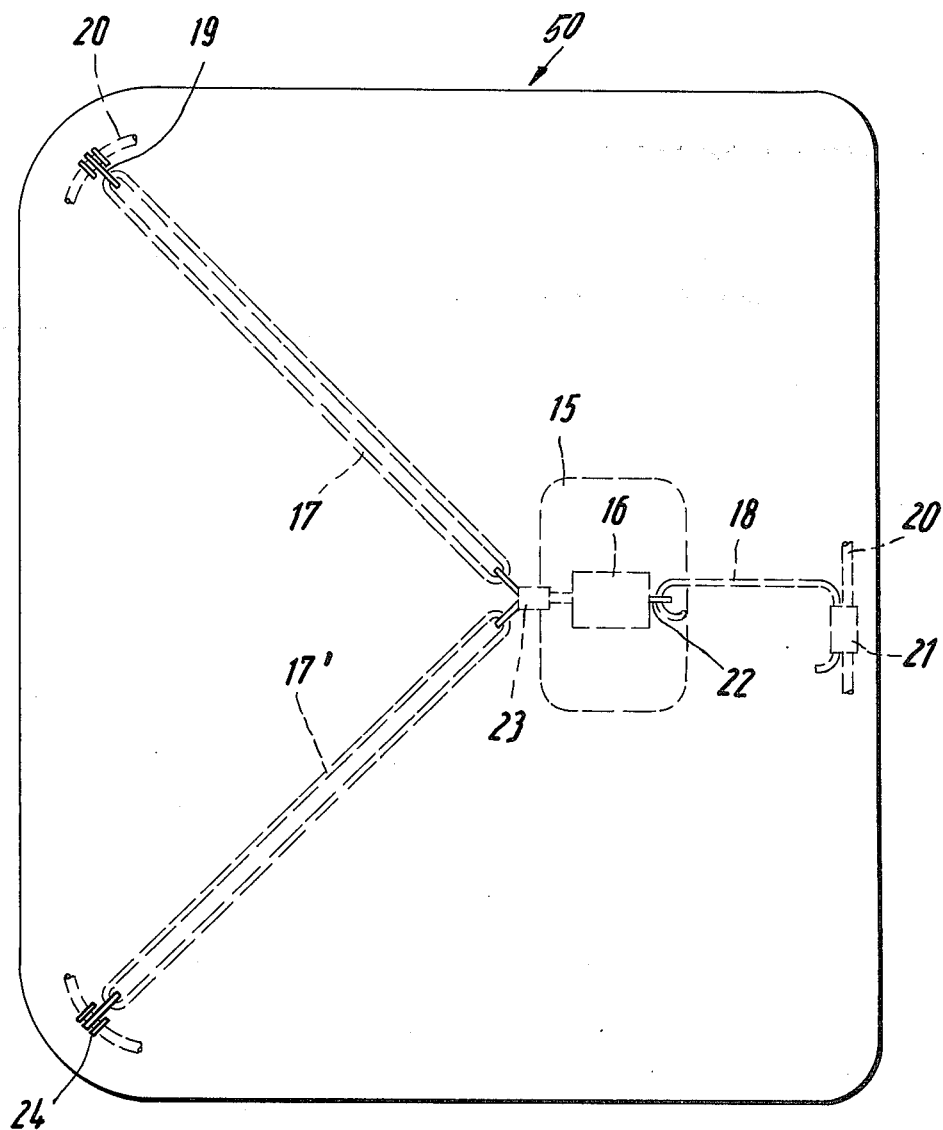
FIG. 2 is a partial bottom plan view of the spring suspension of the seat frame indicated in FIG. 1.

Referring to the drawings in particular, the invention embodied therein comprises, an automobile vehicle seat, generally designated 50, which includes a seat frame base 14 formed of a relatively large diameter tubular member with a seat frame 52 mounted thereon of generally U-shaped cross-section with a front substantially vertical leg portion 52a, a rear substantially vertical leg portion 52b, and a horizontal portion 52c having a spring frame suspension 12. The seat frame is covered by upholstery 11, and a seat cover 10 and a rear portion of the seat 13 is secured above the rear leg 52b. The suspension 12 includes an outermost member or encircling frame element 20.

In accordance with the invention, a pull switch 16 is held to the spring suspension 12 on the underside thereof by means of a contact plate 15 which is arranged in a central area of the seat. The contact plate 15 is connected to the switch housing which carries at one end a plate member or eyelet 22. A rigid support bar 18 is pivotally engaged in the eyelet 22 and has an angled opposite end which is engaged in a clamping sleeve 21 carried at the rear end of the encircling member 20 of the spring frame suspension 12. The switch 16 includes an opposite front end with an actuating member 23 which is mounted to extend laterally therefrom and which may be moved backwardly and forwardly to respective switch positions. The actuating member terminates in two eyelets which are engaged by two O-shaped rubber bands or elastic members 17 and 17'. The rubber bands 17 and 17' extend obliquely outwardly to the respective corners of the encircling member 20 and they are looped through bores of double-bore disc members or plates 19 which are engaged over the encircling member 20 at the respective corners. The plates 19 are anchored in a fixed position on the encircling member 20 by holding discs 24 of a plastic material which are arranged at each side. The members 19 are advantageously formed as engaging hooks in the region of the guide recesses for the spring frame encircling member 20.

The pull switch 16 is pressed by the expanding rubber bands 17 and 17' against the underside of the seat surface, that is, against the underside of the spring suspension 12. When the seating surface is loaded, it sags downwardly to cause the downward movement of the switch 16, together with the contact plate 15. The actuating member 23 is actuated transverse to the movement of the switch housing 16 and is moved to the opposite switch position from that which it holds when the seat is unloaded. The sagging of the seat causes a movement which exceeds the control movement of the normal pull switch but the rubber bands 17 and 17' provide extensible support elements for the switch. When the pull switch has reached a second operative position or end position, the rubber bands 17 and 17' absorb the other sagging movements and extend accordingly. Thus, the switch is not overloaded despite the limited switch movement. The response sensitivity may be adjusted by this resilient suspension of the pull switch in a manner such that it will respond even when it is only slightly loaded, for example, even by the use of a seat by a child. When the load on the seat surface varies to cause a result in change in the sagging, the switch position of the actuator pull switch is not changed.

While a specific embodiment of the invention has been shown and described in detail to illustrate the application of the principles of the invention, it will be understood that the invention may be embodied otherwise without departing from such principles.

What is claimed is:

1. A device for indicating the loading of a seat, particularly an automobile seat, comprising a seat having a spring suspension with an encircling frame, a plate connected to the underside of said spring suspension, a pull switch mounted on said plate, said pull switch having an actuator member extending outwardly from one end of said switch housing and being movable inwardly and outwardly in respect to said switch housing between at least two switch positions, and resilient means supporting said pull switch at the underside of said spring suspension and including a first resilient part connected to said actuator member and to one side of said spring suspension frame and a second resilient part connected to said switch housing in the opposite side of said spring suspension frame from said one side, said switch being movable upon loading and sagging of said spring suspension to cause movement of said actuator from the first switch position to the second switch position, said switch including means for returning said actuator to a first position when the load is removed from said spring suspension.

2. A device for indicating the loading of a seat part of an automobile passenger seat, comprising a seat having a rigid frame with a horizontally extending spring suspension frame portion and a central resilient portion, a switch having a housing with a contact plate portion engaged on the underside of said central resilient portion and having one housing free end and an opposite housing end with an actuating member, and at least one first and second resilient member stretchable between said actuating member and one side of said spring suspension frame and said housing free end and the opposite side of said spring suspension frame.

3. A device for indicating the loading of a seat part of an automobile passenger seat, according to claim 2, wherein said second resilient member comprises a rigid member connected to said housing free end and having an angle portion secured to said spring suspension frame.

4. A device for indicating the loading of a seat part of an automobile passenger seat, according to claim 2, wherein said resilient means comprises two elastic members extending obliquely from said actuating member to respective corners of said spring suspension frame.

5. A device for indicating the loading of a seat part of an automobile passenger seat, comprising a seat having a rigid frame with a horizontally extending spring suspension frame, a switch having a contact plate portion engaged on the underside of said suspension frame and having one end secured to one end of said suspension frame and having an actuating member at the opposite end, resilient means secured to said actuating member and to said spring suspension frame adjacent the opposite end thereof, said resilient means comprising two elastic members extending obliquely from said actuating member to respective corners of said spring suspension frame, said resilient support means comprising rubber bands of O-shaped configuration forming loops at each end which are engaged with said suspension frame and said actuating member respectively.

6. A device for indicating the loading of a seat part of an automobile passenger seat, according to claim 5, including a disc member having two spaced apart bores, one of said bores being engaged over the end of said spring suspension frame and the other one accommodating said elastic bands.

7. A device for indicating the loading of a seat part of an automobile passenger seat, according to claim 6, including a fixing disc arranged around the suspension frame on each side of said disc members.

8. A device for indicating the loading of a seat part of an automobile passenger seat, according to claim 7, wherein said fixing discs are made of resilient plastic material.

9. A device for indicating the loading of a seat part of an automobile passenger seat, according to claim 6, wherein said disc member comprises a member forming an engaging hook around said bores which may be engaged over said spring frame.

* * * * *